US012691529B2

(12) United States Patent
Lin et al.

(10) Patent No.: US 12,691,529 B2
(45) Date of Patent: Jul. 28, 2026

(54) PROCESSING METHOD OF SINGLE-CRYSTAL QUARTZ MATERIAL

(71) Applicant: TXC Corporation, Taipei City (TW)

(72) Inventors: Cheng-Wei Lin, Taipei City (TW); Wun-Kai Wang, Taipei City (TW)

(73) Assignee: TXC Corporation, Taipei City (TW)

( * ) Notice: Subject to any disclaimer, the term of this patent is extended or adjusted under 35 U.S.C. 154(b) by 104 days.

(21) Appl. No.: 18/967,646

(22) Filed: Dec. 4, 2024

(65) Prior Publication Data

US 2026/0138214 A1    May 21, 2026

(30) Foreign Application Priority Data

Nov. 20, 2024    (TW) ................................. 113144657

(51) Int. Cl.
B23K 26/38           (2014.01)
(52) U.S. Cl.
CPC ..................................... B23K 26/38 (2013.01)
(58) Field of Classification Search
CPC ......... B23K 26/38; B23K 26/50; B23K 26/53
See application file for complete search history.

(56) References Cited

FOREIGN PATENT DOCUMENTS

| TW | 201025691 A | * | 7/2010 | ............. H01L 41/22 |
| TW | 201308416 | | 2/2013 | |
| TW | 201815506 | | 5/2018 | |
| TW | 202434383 | | 9/2024 | |

OTHER PUBLICATIONS

"Office Action of Taiwan Counterpart Application", issued on Jun. 4, 2025, p. 1-p. 4.

* cited by examiner

*Primary Examiner* — James Sanders
(74) *Attorney, Agent, or Firm* — JCIPRNET

(57) ABSTRACT

A processing method of single-crystal quartz material includes the following steps. Determining an area to be processed where twin crystals are prone to occur on the single-crystal quartz material. Using a heater to heat an area to be processed on the single-crystal quartz material, so that processing difficulty of the area to be processed is reduced. Using a laser to process the single-crystal quartz material in a heated portion of the area to be processed.

10 Claims, 7 Drawing Sheets

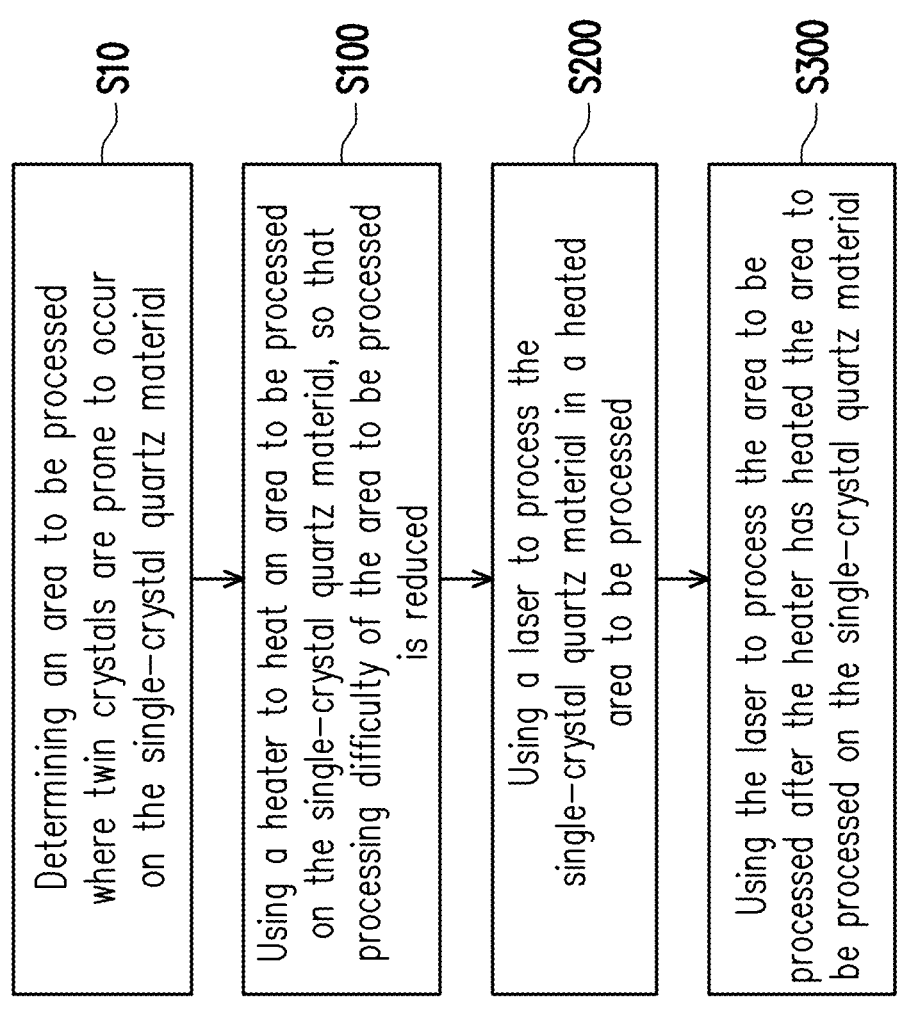

S10

Determining an area to be processed where twin crystals are prone to occur on the single-crystal quartz material

S100

Using a heater to heat an area to be processed on the single-crystal quartz material, so that processing difficulty of the area to be processed is reduced

S200

Using a laser to process the single-crystal quartz material in a heated area to be processed

S300

Using the laser to process the area to be processed after the heater has heated the area to be processed on the single-crystal quartz material

FIG. 1

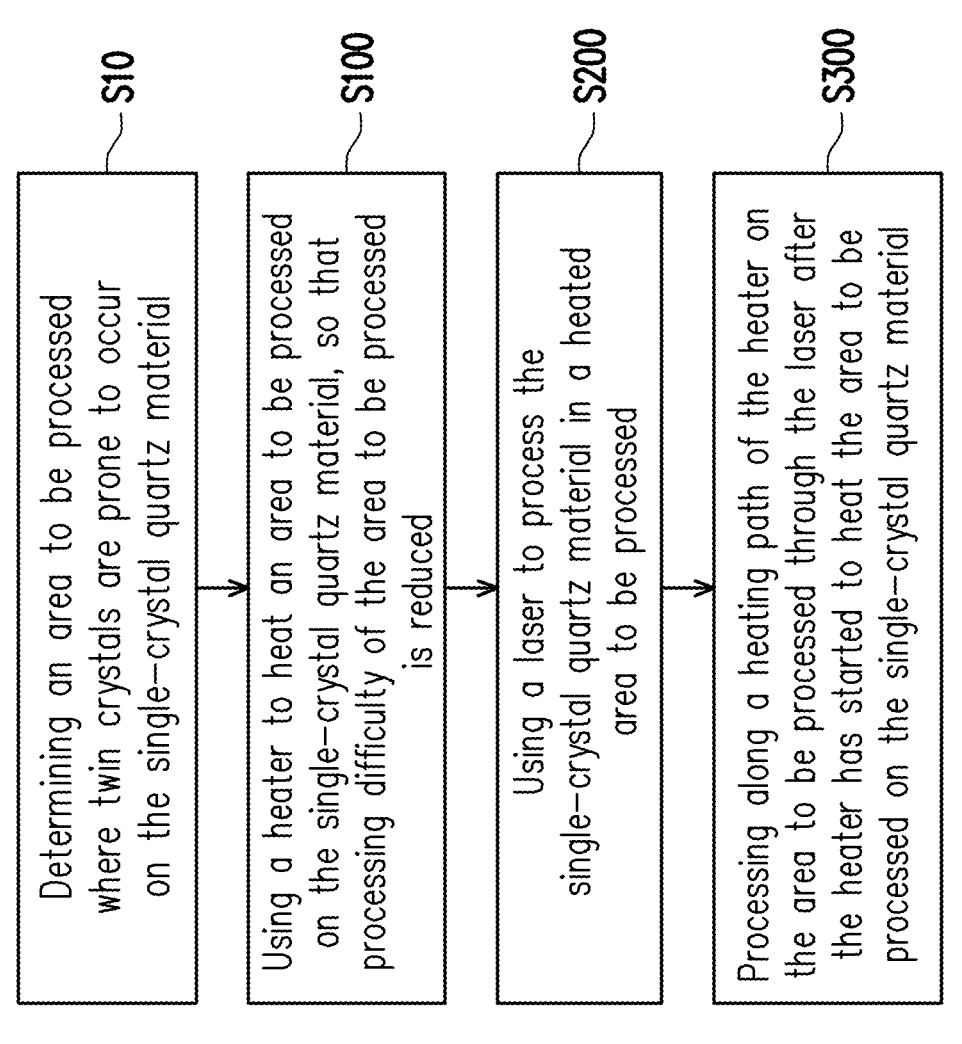

S10

Determining an area to be processed where twin crystals are prone to occur on the single-crystal quartz material

S100

Using a heater to heat an area to be processed on the single-crystal quartz material, so that processing difficulty of the area to be processed is reduced

S200

Using a laser to process the single-crystal quartz material in a heated area to be processed

S300

Processing along a heating path of the heater on the area to be processed through the laser after the heater has started to heat the area to be processed on the single-crystal quartz material

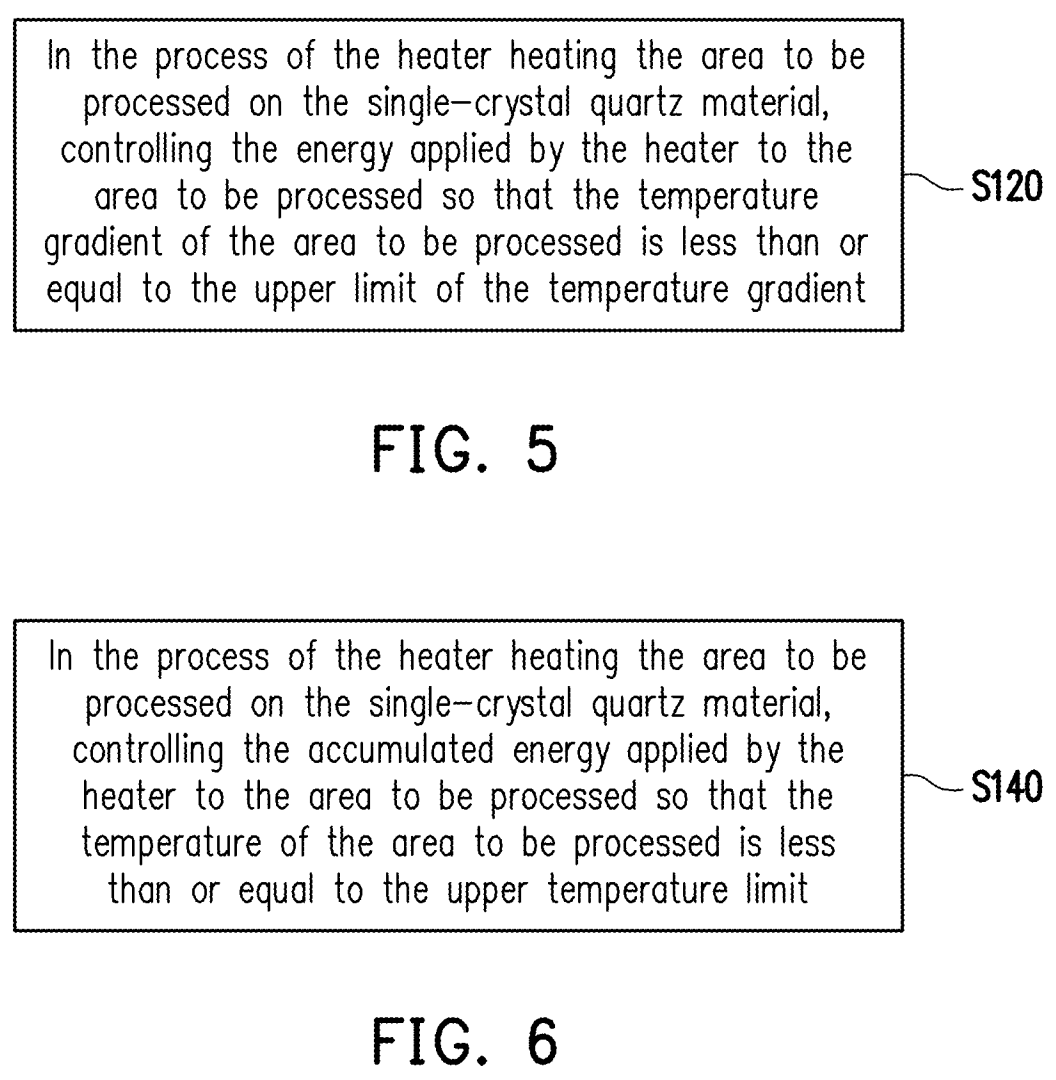

In the process of the heater heating the area to be processed on the single-crystal quartz material, controlling the energy applied by the heater to the area to be processed so that the temperature gradient of the area to be processed is less than or equal to the upper limit of the temperature gradient

In the process of the heater heating the area to be processed on the single-crystal quartz material, controlling the accumulated energy applied by the heater to the area to be processed so that the temperature of the area to be processed is less than or equal to the upper temperature limit

FIG. 6

Figures 7, 8:
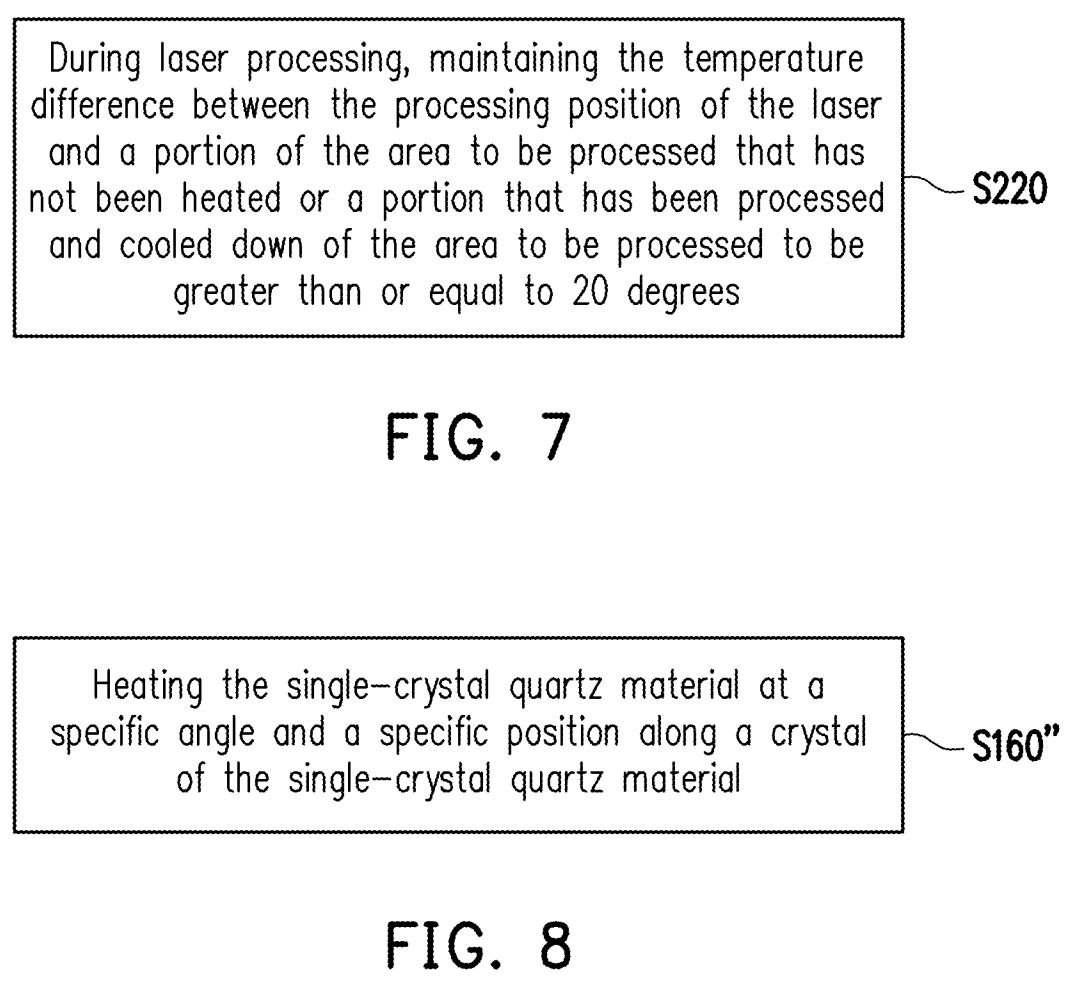

During laser processing, maintaining the temperature difference between the processing position of the laser and a portion of the area to be processed that has not been heated or a portion that has been processed and cooled down of the area to be processed to be greater than or equal to 20 degrees

Heating the single-crystal quartz material at a specific angle and a specific position along a crystal of the single-crystal quartz material

PROCESSING METHOD OF SINGLE-CRYSTAL QUARTZ MATERIAL

CROSS-REFERENCE TO RELATED APPLICATION

This application claims the priority benefit of Taiwan application serial no. 113144657, filed on Nov. 20, 2024. The entirety of the above-mentioned patent application is hereby incorporated by reference herein and made a part of this specification.

BACKGROUND

Technical Field

The disclosure relates to a processing method, and in particular relates to a processing method of a single-crystal quartz material.

Description of Related Art

Since the etching process includes multiple processes, including physical vapor deposition (PVD), photolithography and dry/wet etching, compared with using etching to process materials, using laser processing may streamline manufacturing processes, reduce processing costs, and reduce the load on the etching station, thereby improving production efficiency.

Currently, ultrafast lasers are used to process single-crystal quartz, and their laser wavelengths are mostly between the UV and IR wavelengths of 355 nm to 1064 nm. The transmittance of quartz for these wavelengths is close to 90%, so more energy is required during processing to induce ablation on the surface of the quartz material, which in turn leads to excessive heat accumulation. Excessive local temperature or excessive temperature gradient leads to the occurrence of twin crystals.

SUMMARY

A processing method of single-crystal quartz material, which may effectively prevent twin crystals from occurring on the single-crystal quartz material after processing, is provided in the disclosure.

An embodiment of the disclosure provides a processing method of single-crystal quartz material, which includes the following operation. An area to be processed where twin crystals are prone to occur on the single-crystal quartz material is determined. A heater is used to heat the area to be processed on the single-crystal quartz material, so that processing difficulty of the area to be processed is reduced. A laser is used to process the single-crystal quartz material in a heated portion of the area to be processed.

Based on the above, in one embodiment of the disclosure, the processing method of single-crystal quartz material includes using a heater to heat an area to be processed on the single-crystal quartz material, so that processing difficulty of the area to be processed is reduced, and using a laser to process the single-crystal quartz material in a heated portion of the area to be processed. Therefore, heating the area to be processed first effectively reduces the thermal threshold required to produce processing effects during processing, and may reduce heat accumulation or thermal effects, thereby reducing the processing temperature and temperature gradient. Due to the above-mentioned effect of reducing the processing temperature and temperature gradient, the processing method of single-crystal quartz material may further prevent the problem of twin crystals occurring during the processing.

BRIEF DESCRIPTION OF THE DRAWINGS

FIG. 1 is a flowchart of a processing method of single-crystal quartz material according to an embodiment of the disclosure.

FIG. 3 is a flowchart of a processing method of single-crystal quartz material according to another embodiment of the disclosure.

FIG. 5 is a detailed flowchart of step S100 in FIG. 1 or FIG. 3.

FIG. 6 is a detailed flowchart of step S100 in FIG. 1 or FIG. 3.

FIG. 7 is a detailed flowchart of step S200 in FIG. 1 or FIG. 3.

FIG. 8 is a detailed flowchart of a processing method of single-crystal quartz material and step S100 in FIG. 1 or FIG. 3 according to another embodiment of the disclosure.

DETAILED DESCRIPTION OF DISCLOSED EMBODIMENTS

Figure 2:
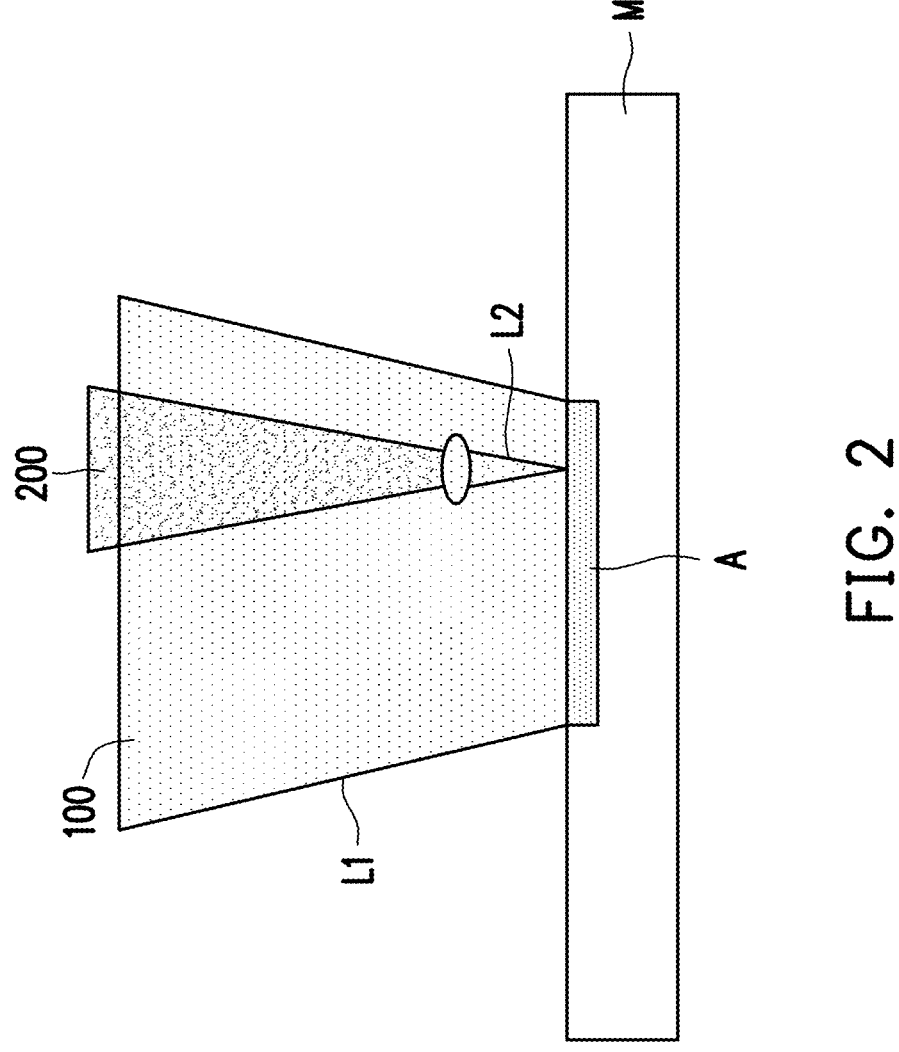
FIG. 2 is a schematic diagram of using a laser to process the area to be processed after the heater has heated the area to be processed on the single-crystal quartz material in the processing method of single-crystal quartz material according to an embodiment of the disclosure.

FIG. 1 is a flowchart of a processing method of single-crystal quartz material according to an embodiment of the disclosure. FIG. 2 is a schematic diagram of using a laser to process the area to be processed after the heater has heated the area to be processed on the single-crystal quartz material in the processing method of single-crystal quartz material according to an embodiment of the disclosure. Referring to FIG. 1 and FIG. 2, one embodiment of the disclosure provides a processing method of single-crystal quartz material, which includes the following steps. In step S10, an area to be processed A where twin crystals are prone to occur on the single-crystal quartz material M is determined. In step S100, a heater 100 is used to heat the area to be processed A on the single-crystal quartz material M, so that the processing difficulty of the area to be processed A is reduced. In step S200, a laser 200 is used to process the single-crystal quartz material M in the heated portion of the area to be processed A. The above-mentioned heating range of the single-crystal quartz material M using the heater 100 may be larger than/encompassing the area to be processed A. Moreover, when the part to be processed includes the single-crystal quartz material M and other objects, the above-mentioned heating range using the heater 100 may be larger than the complete range of the single-crystal quartz material M.

In this embodiment, the single-crystal quartz material M is, for example, $\alpha$-SiO$_2$ with a temperature T<573° C. The heater 100, for example, heats the area to be processed A in a direct/indirect or contact/non-contact manner. For example, the heater 100 may be a non-contact heater: a laser light source or an infrared heater; the heater 100 may be a contact heater: a heating carrier configured to carry the single-crystal quartz material M, but the disclosure is not limited thereto.

In this embodiment, the processing method of single-crystal quartz material further includes the following steps. In step S300, after the heater 100 has heated the area to be processed A on the single-crystal quartz material M, the laser 200 is then used to process the area to be processed A.

When the heater 100 is a laser light source, the beam size of the light beam L1 emitted by the laser light source that irradiates the area to be processed A is larger than the beam size of the light beam L2 emitted by the laser 200 that irradiates the area to be processed A. That is, the light beam L1 emitted by the laser light source is only focused on the heating of the area to be processed A, and it is necessary to avoid the temperature or temperature gradient being too high such that twin crystals occur during the heating process. Therefore, the beam size of the light beam L1 irradiating the area to be processed A is larger than the beam size of the light beam L2 irradiating the area to be processed A. In addition, the wavelength of the light beam L1 emitted by the laser light source may be the same as the wavelength of the light beam L2 emitted by the laser 200. However, in a preferred embodiment, the wavelength of the light beam L1 emitted by the laser light source is different from the wavelength of the light beam L2 emitted by the laser 200.

Figure 4:
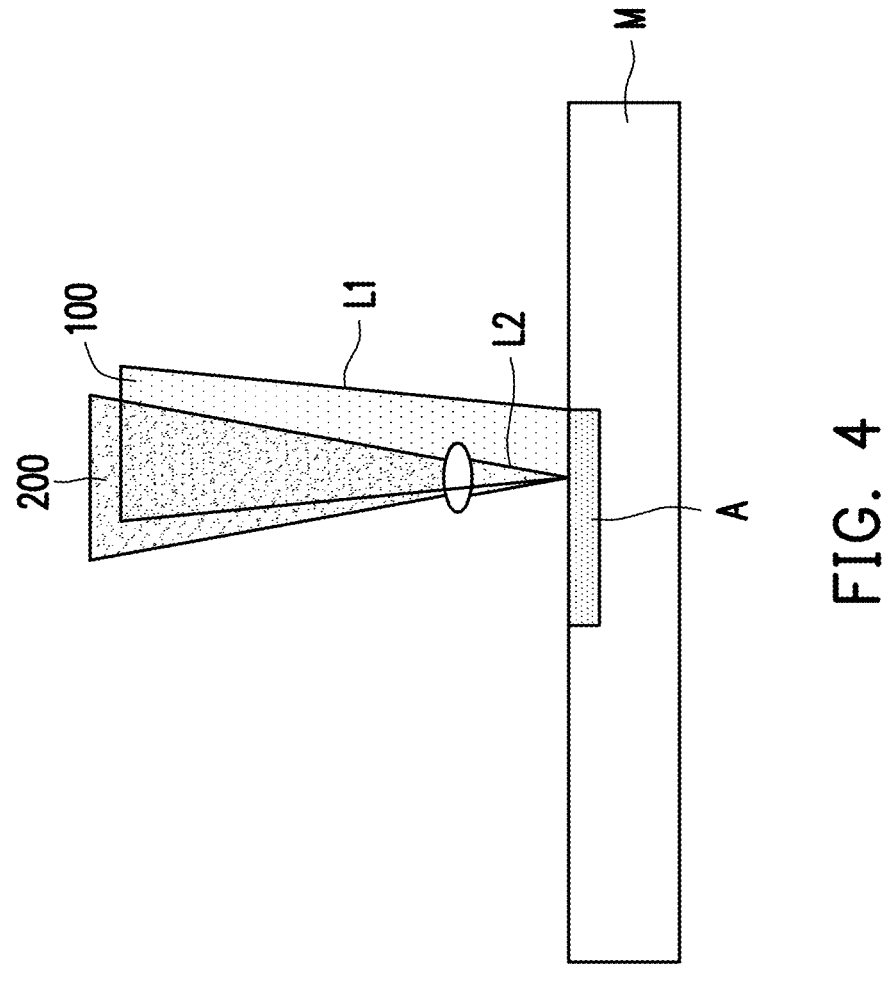
FIG. 4 is a schematic diagram of processing along a heating path of the heater on the area to be processed through the laser after the heater has started to heat the area to be processed on the single-crystal quartz material in the processing method of single-crystal quartz material according to an embodiment of the disclosure.

FIG. 3 is a flowchart of a processing method of single-crystal quartz material according to another embodiment of the disclosure. FIG. 4 is a schematic diagram of processing along a heating path of the heater on the area to be processed through the laser after the heater has started to heat the area to be processed on the single-crystal quartz material in the processing method of single-crystal quartz material according to an embodiment of the disclosure. Referring to FIG. 3 and FIG. 4, in this embodiment, the processing method of single-crystal quartz material further includes the following steps. In step S300', after the heater 100 has started to heat the area to be processed A on the single-crystal quartz material M, the laser 200 is then used to process along the heating path of the heater 100 on the area to be processed A.

FIG. 5 is a detailed flowchart of step S100 in FIG. 1 or FIG. 3. Referring to FIG. 5, in this embodiment, the above-mentioned step S100 includes the following steps. In step S120, in the process of the heater 100 heating the area to be processed A on the single-crystal quartz material M, the energy applied by the heater 100 to the area to be processed A is controlled so that the temperature gradient of the area to be processed A is less than or equal to the temperature gradient upper limit.

FIG. 6 is a detailed flowchart of step S100 in FIG. 1 or FIG. 3. Referring to FIG. 6, in this embodiment, the above-mentioned step S100 further includes the following steps. In step S140, in the process of the heater 100 heating the area to be processed A on the single-crystal quartz material M, the accumulated energy applied by the heater 100 to the area to be processed A is controlled so that the temperature of the area to be processed A is less than or equal to the upper temperature limit. The upper temperature limit is, for example, 573 degrees Celsius.

That is, during the heating process, the instantaneous energy and accumulated energy applied to the area to be processed A are controlled to avoid twin crystals from occurring in single-crystal quartz material M during heating.

FIG. 7 is a detailed flowchart of step S200 in FIG. 1 or FIG. 3. Referring to FIG. 6, in this embodiment, the above-mentioned step S200 further includes the following steps. In step S220, when processing with the laser 200, the temperature difference between the processing position of the laser 200 and a portion in the area to be processed that has not been heated or a portion that has been processed and cooled down is maintained to be greater than or equal to 20 degrees. That is, the heated position to be processed maintains a temperature difference of at least 20 degrees from other positions. Therefore, the processing is conducted when the heated position is continuously heated or within the time frame when the heated position is heated and a temperature difference of at least 20 degrees is maintained prior to cooling down.

FIG. 8 is a detailed flowchart of a processing method of single-crystal quartz material and step S100 in FIG. 1 or FIG. 3 according to another embodiment of the disclosure. Referring to FIG. 8, in another embodiment, the above-mentioned step S100 further includes the following steps. Step S160", the single-crystal quartz material M is heated along a specific angle and a specific position of the crystal of the single-crystal quartz material M. That is, during the heating process, specific angles and specific positions where twin crystals are prone to occur are preferably heated, which may further avoid the occurrence of twin crystals during the processing.

Figure 9:
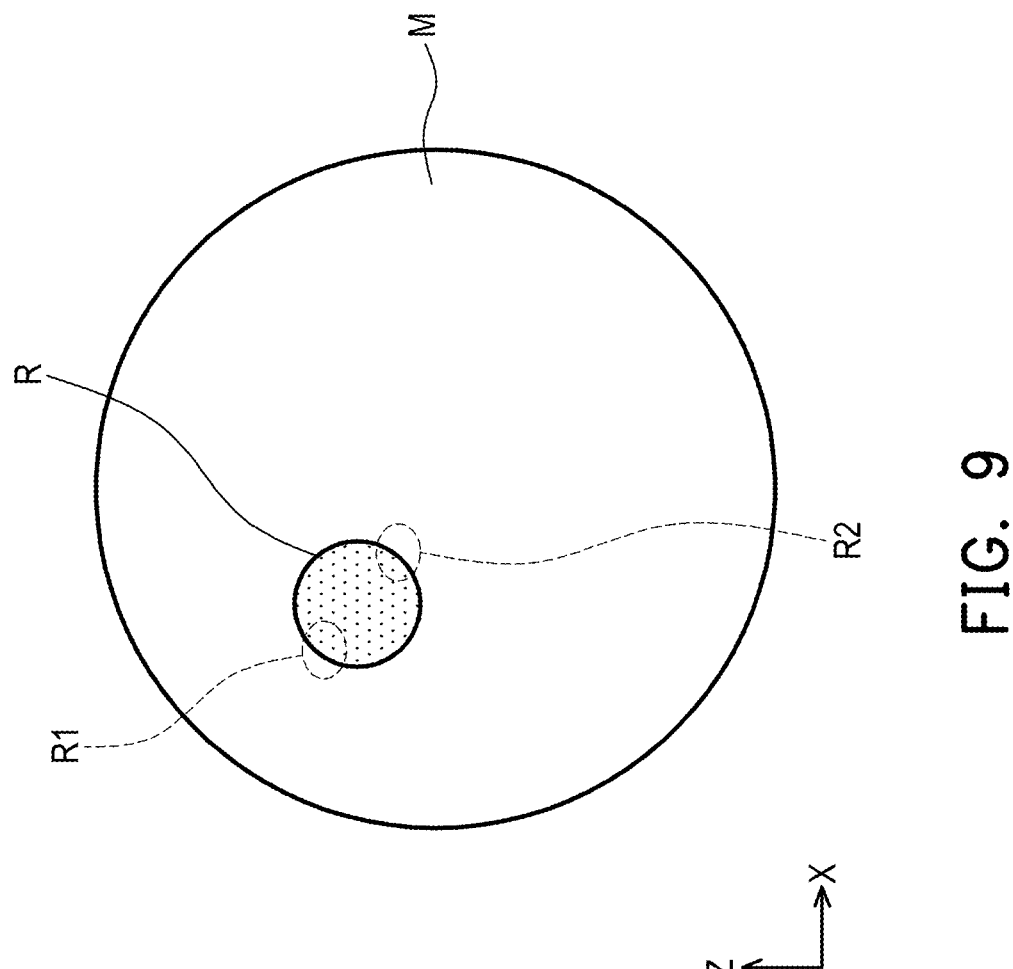
FIG. 9 is a schematic diagram of a specific angle or a specific position of a crystal on the single-crystal quartz material in the processing method of single-crystal quartz material according to an embodiment of the disclosure.

FIG. 9 is a schematic diagram of a specific angle or a specific position of a crystal on the single-crystal quartz material in the processing method of single-crystal quartz material according to an embodiment of the disclosure. Taking FIG. 9 as an example, if the single-crystal quartz material M is cut using the AT cut method, on the X-Z plane of the single-crystal quartz material M, there is a first twin crystal region R1 in the upper left corner of the region R where twin crystals are prone to occur, and there is a second twin crystal region R2 where twin crystals are prone to occur at 180 degrees corresponding to the first twin crystal region R1. Therefore, in the above step S160", the first twin crystal region R1 and the second twin crystal region R2 are modified preferentially. However, the disclosure is not limited to the positions or angles of the first twin crystal region R1 and the second twin crystal region R2. The specific angle and specific position of the crystals on the single-crystal quartz material M should be determined according to the characteristics of the single-crystal quartz material M during processing.

To sum up, in an embodiment of the disclosure, the processing method of single-crystal quartz material includes the following steps. A heater is used to heat the area to be processed on the single-crystal quartz material, so that processing difficulty of the area to be processed is reduced. A laser is used to process the single-crystal quartz material in a heated portion of the area to be processed. Therefore, heating the area to be processed first effectively reduces the thermal threshold required to produce processing effects during processing, and may reduce heat accumulation or thermal effects, thereby reducing the processing temperature and temperature gradient. Due to the above-mentioned effect of reducing the processing temperature and temperature gradient, the processing method of single-crystal quartz material may further prevent the problem of twin crystals occurring during the processing.

What is claimed is:
1. A processing method of single-crystal quartz material, comprising:

determining an area to be processed where twin crystals are prone to occur on the single-crystal quartz material;

using a heater to heat the area to be processed on the single-crystal quartz material, so that processing difficulty of the area to be processed is reduced;

using a laser to process the single-crystal quartz material in a heated portion of the area to be processed;

wherein using the laser to process the single-crystal quartz material in the heated portion of the area to be processed comprises:

maintaining a temperature difference between a processing position of the laser and a portion in the area to be processed that has not been heated or a portion that has been processed and cooled down to be greater than or equal to 20 degrees C. when processing with the laser.

2. The processing method of the single-crystal quartz material according to claim 1, wherein the heater is a laser light source, an infrared heater, or a heating carrier configured to carry the single-crystal quartz material.

3. The processing method of the single-crystal quartz material according to claim 1, further comprising:

further using the laser to process the area to be processed after the heater has heated the area to be processed on the single-crystal quartz material.

4. The processing method of the single-crystal quartz material according to claim 1, further comprising:

further using the laser to process along a heating path of the heater on the area to be processed after the heater has started to heat the area to be processed on the single-crystal quartz material.

5. The processing method of the single-crystal quartz material according to claim 1, wherein the heater is a laser light source, and a beam size of a light beam emitted by the laser light source that irradiates the area to be processed is larger than a beam size of a light beam emitted by the laser that irradiates the area to be processed.

6. The processing method of the single-crystal quartz material according to claim 1, wherein the heater is a laser light source, wherein a wavelength of a light beam emitted by the laser light source is different from a wavelength of a light beam emitted by the laser.

7. The processing method of the single-crystal quartz material according to claim 1, wherein using the heater to heat the area to be processed on the single-crystal quartz material further comprises:

controlling energy applied by the heater to the area to be processed so that a temperature gradient of the area to be processed is less than or equal to a temperature gradient upper limit in a process of the heater heating the area to be processed on the single-crystal quartz material.

8. The processing method of the single-crystal quartz material according to claim 1, wherein using the heater to heat the area to be processed on the single-crystal quartz material further comprises:

controlling accumulated energy applied by the heater to the area to be processed so that a temperature of the area to be processed is less than or equal to an upper temperature limit in a process of the heater heating the area to be processed on the single-crystal quartz material.

9. The processing method of the single-crystal quartz material according to claim 8, wherein the upper temperature limit is 573 degrees Celsius.

10. The processing method of the single-crystal quartz material according to claim 1, wherein using the heater to heat the area to be processed on the single-crystal quartz material further comprises:

heating the single-crystal quartz material along a specific angle and a specific position of a crystal of the single-crystal quartz material.

* * * * *